March 31, 1936.  R. E. VIVIAN  2,035,850
MANUFACTURE OF PHOSPHORIC ACID
Filed April 4, 1933
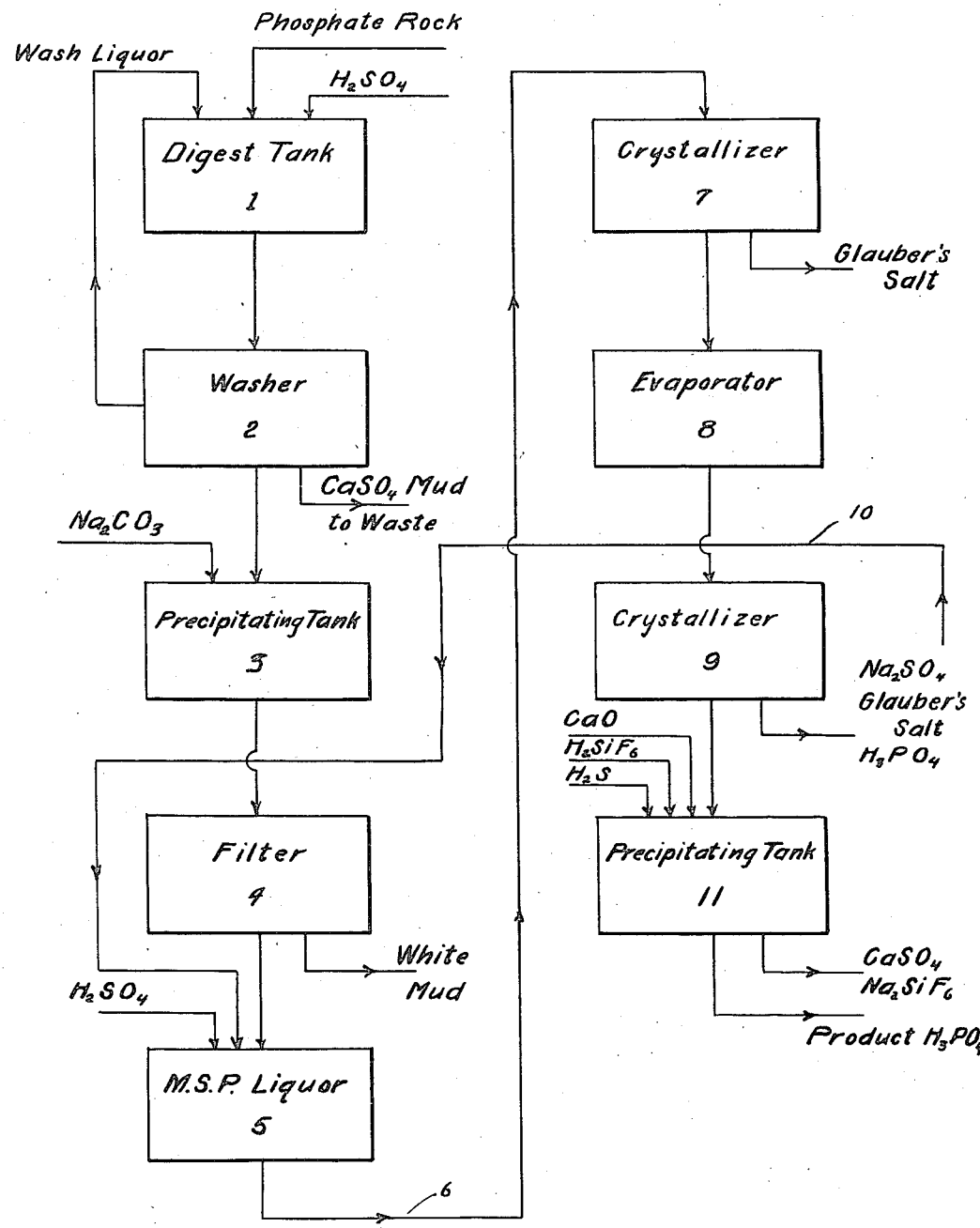
INVENTOR
Robert E. Vivian
BY
ATTORNEY Patented Mar. 31, 1936

2,035,850

UNITED STATES PATENT OFFICE 2,035,850

MANUFACTURE OF PHOSPHORIC ACID

Robert E. Vivian, New York, N. Y., assignor to General Chemical Company, New York, N. Y., a corporation of New York Application April 4, 1933, Serial No. 664,291

3 Claims. (Cl. 23—165)

This invention relates to the production of phosphoric acid, and particularly to the production from crude phosphoric acid of a high-grade phosphoric acid substantially free from impurities. The invention is especially directed to methods for making from crude phosphoric acid a relatively pure phosphoric acid suitable for use in the manufacture of foods, medicines, etc.

Heretofore, pure phosphoric acid has been produced generally by combustion of phosphorus. Suggestions have also been made relative to the manufacture of relatively pure phosphoric acid from alkali metal phosphates and from crude phosphoric acid.

In methods for making pure phosphoric acid from crude phosphoric acid, it has been proposed to treat crude phosphoric acid with lime, thereby forming a phosphate of calcium, and precipitating impurities such as iron and aluminum as insoluble phosphates, and fluorine and silica as calcium fluosilicate. The precipitated impurities were filtered out, and the filtrate treated with sulfuric acid producing phosphoric acid and calcium sulfate. Calcium sulfate is separated from the relatively pure phosphoric acid. By this method, the lime and sulfuric acid utilized in purifying the crude phosphoric acid are recovered as calcium sulfate.

It has also been proposed to digest phosphate rock with bisulfate of soda producing phosphoric acid, sodium sulfate and calcium sulfate. The latter is separated from the liquor, and sodium sulfate may be recovered by crystallization. In proceeding in accordance with this method, it is to be observed the phosphoric acid liquor remaining after separation of calcium sulfate and sodium sulfate is a relative impure acid containing substantially all of the impurities introduced with the phosphate rock. In effect, the acid mother liquor is a crude phosphoric acid solution.

It is one of the principal objects of the present invention to provide an improved process for the production from crude phosphoric acid of a high-grade phosphoric acid substantially free from impurities. As a further object, the invention contemplates the provision of a method for making pure phosphoric acid from crude phosphoric acid, according to the preferred procedure of which method, the materials used to effect purification of the crude acid, are recovered from the process as a by-product having a substantial market value. Another object of the invention comprises the provision of a process by means of which relatively small amounts of impurities such as sulfate, lead and arsenic may be readily removed from phosphoric acid to produce a relatively pure acid.

Briefly stated, a desirable embodiment of the process of the invention involves production of crude phosphoric acid by digesting phosphate rock with sulfuric acid thereby producing a digest liquor containing principally phosphoric acid and calcium sulfate, together with impurities such as iron, aluminum, fluorine, etc. After separation from the liquor of insolubles, chiefly calcium sulfate, the crude phosphoric acid is partially neutralized with soda ash to thereby remove from the liquor, as insoluble precipitates, the so-called "white-muds" comprising chiefly sodium fluosilicate together with phosphates of calcium, iron, and aluminum. The partially neutralized liquor, after the white muds have been removed by filtration or otherwise, is then treated with sulfuric acid, in quantities to convert the sodium phosphate to phosphoric acid, and form sodium sulfate. The sodium sulfate is removed from the phosphoric acid mother liquor by successive crystallization, and the resulting phosphoric acid solution, which may contain relatively small amounts of sodium sulfate, is treated in a particular hereinafter described method to effect removal therefrom of substantially all of the sodium sulfate, and other impurities such as lead and arsenic, thereby producing a high grade relatively pure phosphoric acid.

Further objects and advantages of the invention will be apparent from the following discussion taken in connection with the accompanying drawing showing, diagrammatically in flow sheet form, a system adapted for carrying out the invention.

Referring to the drawing, a digest tank 1 is provided into which is introduced ground phosphate rock which may, if desired, have been previously calcined to effect removal of organic matter. Phosphate rock is essentially calcium phosphate, and to decompose the phosphate and liberate phosphoric acid, a quantity of sulfuric acid, for example of 66° Bé. strength, is introduced into the digest tank. The exact amount of acid employed will vary with the composition of the rock, and the quantity of acid added may be determined as is well known in the art. Preferably, a relatively small deficiency of sulfuric acid is used so that the resulting crude phosphoric acid contains no free sulfuric acid and preferably does contain a small amount of monocalcium phosphate. The first strong wash water from subsequent washing of the calcium sulfate is desirably returned to the digest tank to thereby recover the soluble phosphate values therein. The mix of rock, acid, and wash water is agitated in a digest tank 1 for a time sufficient to effect decomposition of the rock, the resultant product being an insoluble precipitate consisting chiefly of calcium sulfate, and liquor containing essentially phosphoric acid, preferably a small amount of monocalcium phosphate and no free sulfuric acid, and an amount of hydrofluosilicic acid corresponding with that portion of the fluorine in the rock which is passed into the liquor.

The precipitated calcium sulfate and the phosphoric acid liquor are passed to washer 2, preferably of the decantation type such as a Dorr thickener, wherein the mud is separated from liquor and washed.

Crude phosphoric acid produced in this manner contains appreciable amounts of impurities such as calcium, iron, and aluminum, and a substantial amount of hydrofluosilicic acid from the fluorine present in the original rock. The fluorine content in the phosphate rock is usually high, running as much as 4.0%. The elimination of the impurities, particularly fluorine, from crude phosphoric acid, presents well recognized problems in the art, and the removal of fluorine from the acid, in conjunction with other steps, constitutes one feature of the improved process.

Crude phosphoric acid solution from washer 2 is now passed into a precipitating tank 3 in which the acid liquor is partially neutralized with an alkali, such as sodium carbonate, to convert crude phosphoric acid to an alkali metal phosphate, in the preferred embodiment of the invention to monosodium phosphate. The crude phosphoric acid is only partially neutralized, because, in accordance with the preferred forms of the process of the invention, i. e., the production of monosodium phosphate in this intermediate stage of the process, only about one-third of the total amount of alkali which will combine with the phosphoric acid is added. To obtain the most desirable results, economically, partial neutralization of the crude phosphoric acid is carried out in a particular preferred manner. Such partial neutralization is effected as hereinafter noted, first, to insure elimination of fluorine from the final phosphoric acid product; second, to require utilization of a relatively small amount of alkali to effect partial neutralization and a major part of the purification of the crude phosphoric acid, and third to avoid use of considerable quantities of sulfuric acid, and the production of unduly large amounts of sodium sulfate in the subsequent conversion of sodium phosphate to phosphoric acid.

Partial neutralization in precipitating tank 3 is preferably controlled so as to effect precipitation from the liquor of calcium, iron and aluminum as insoluble phosphates, and of fluorine as sodium fluosilicate. Furthermore, precipitation of fluorine in tank 3 aids in preventing filtering difficulties in filter 4.

Generally speaking, with reference to the elimination of fluorine from the liquor, neutralization may be carried out in the precipitating tank 3 substantially in accordance with the method disclosed in Levermore U. S. P. 1,866,657 of July 12, 1932. Briefly, when proceeding as indicated in the Levermore patent, where neutralization is so controlled as to produce a condition in the liquor, after the addition of the alkali, within the limits of weak acidity to the indicator known as phenolphthalein on the one hand, and weak alkalinity to the indicator known as methyl orange on the other hand, substantially complete precipitation of the fluorine, as sodium fluosilicate, occurs, since this substance is not soluble to any great extent in liquor of this composition so that the practically complete removal of fluorine from the system may thus be accomplished.

The condition of weak acidity to phenolphthalein corresponds to a composition of the liquor in which almost all of the phosphate is present as disodium phosphate, and the remaining small amount as monosodium phosphate, and there is no trisodium phosphate present. The condition of weak alkalinity to methyl orange corresponds to a composition of the liquor in which almost all of the phosphate is present as monosodium phosphate, with but a small amount of di-sodium phosphate, there being no free phosphoric acid present. Within the range defined by the two conditions of weak acidity to phenolphthalein and weak alkalinity to methyl orange, the liquor will have a composition corresponding to a mixture of disodium phosphate and monosodium phosphate in proportions varying from practically 100% di-sodium phosphate to substantially 100% monosodium phosphate. That is, where the liquor contains from substantially 100% monosodium phosphate and little di-sodium phosphate, to substantially 100% di-sodium phosphate and a little monosodium phosphate, the solubility of sodium fluosilicate is small, and substantially complete precipitation of fluorine may be effected in the precipitating tank 3 with control conditions as above noted.

In carrying out the process of the present invention, with respect to the removal of fluorine from the liquor and the production of a substantially fluorine-free phosphoric acid, partial neutralization in the precipitating tank 3, may, if desired, be carried out to the extent of producing substantially all di-sodium phosphate liquor and substantially no trisodium phosphate. However, in the preferred operation of the process, as procedure subsequent to removal of impurities in the precipitating tank 3 involves the addition of sulfuric acid to the sodium phosphate liquor to remove sodium as sodium sulfate, and produce a relatively pure phosphoric acid, in order to hold at a minimum the amount of sulfuric acid required for this purpose and to reduce the amount of sodium sulfate formed, it is preferred to carry neutralization in tank 3 only to about the monosodium point. By so doing, the absence of fluorine impurities in the product is insured, and at the same time the use of large amounts of sulfuric acid and production of relatively large quantities of sodium sulfate are avoided.

When employing sodium carbonate (soda ash) as a source of alkali to partially neutralize the crude phosphate liquor and precipitate impurities in the precipitating tank 3, carbonic acid will be liberated as a result of the reaction between the phosphoric acid and the alkali metal carbonate.

As above observed, the crude phosphoric acid prior to addition of soda ash preferably contains no free sulfuric acid, and does contain a small amount of monocalcium phosphate. When carrying out partial neutralization so as to produce a monosodium phosphate liquor, the presence of a small amount of monocalcium phosphate is preferred since it appears a more complete precipitation of fluosilicate and other impurities such as iron and aluminum is obtained.

To further precipitation of impurities, it is preferred to heat the liquor to boiling after the addition of the soda ash, and keep the liquor hot at about the boiling temperature, for a substantial period of time, say from two to three hours, this procedure bringing about a substantially complete precipitation of fluosilicate and other impurities such as calcium, iron and aluminum, thus insuring absence of impurities in the final product.

After this operation is complete, and neutralization has been so controlled as to produce substantially all monosodium phosphate, the liquor should react acid to phenolphthalein and alkaline to methyl orange if the proper amount of soda ash has been initially added, and if it does not, proper correction might be made by the addition of small amounts of phosphoric acid or alkali as needed.

As noted, the phosphoric acid liquor introduced into tank 3 contains small amounts of soluble phosphate of calcium, iron, and aluminum, besides hydrofluosilicic acid. These soluble phosphates are precipitated, along with sodium fluosilicate, upon partial neutralization of the acid in the form of insoluble phosphates of calcium, iron and aluminum, the precipitate thus formed constituting what is known in the art as "white mud". This white mud precipitate is separated from the monosodium phosphate liquor in filter 4, the filtrate of which is substantially free from fluorine and other impurities such as compounds of calcium, iron and aluminum.

The liquor, preferably monosodium phosphate, is run into digest tank 5, and is treated therein with sulfuric acid in amounts sufficient to convert the sodium phosphate to sodium sulfate, and liberate phosphoric acid. The liquor containing phosphoric acid and sodium sulfate is then run through line 6 into crystallizer 7 and cooled therein, for example to about 40° F. The sodium sulfate crystallizes out as Glauber's salt. In this operation, substantially 70-80% of the sodium sulfate is removed from the solution. By this procedure, the sodium of the soda ash and the sulfate of the sulfuric acid are recovered as sodium sulfate, a product having a good market value.

The phosphoric acid mother liquor, after separation of crystallized sodium sulfate, is then transferred to evaporator 8, and evaporated therein until the boiling point of the phosphoric acid liquor is about 300° F. In accordance with the invention it is preferable to concentrate the acid by evaporation to this degree so as to facilitate further removal of sulfate in a crystallizer 9 into which the evaporated liquor is run.

In the crystallizer 9, the liquor is cooled to about room temperature, and a mixture of Glauber's salt and anhydrous sodium sulfate is formed. This mixture, together with some phosphoric acid, is separated from the liquor, and passed through the line 10 into the digest tank 5 thus recovering, by recycling, the sodium sulfate and phosphoric acid contained in the impure mixture discharged from the crystallizer 9.

The liquor from the crystallizer is then run into a precipitating tank 11. In the latter, the acid liquor is treated, preferably first with a sulfide, such as hydrogen sulfide, to effect precipitation, as sulfides, of any lead and/or arsenic which may be contained in the liquor. Where the phosphoric acid of the process of the invention is to be used in the manufacture of foods, the treatment of the liquor in precipitating tank 11 with hydrogen sulfide is particularly desirable to insure absence of lead and arsenic from the ultimate acid product.

There may remain in the liquor small amounts of sulfate which may be removed by treatment of the liquor with hydrofluosilicic acid and lime. Although the latter substances may be added to the liquor simultaneously, or the lime added first, it is preferred to add the acid first and then the lime, as the removal of sodium sulfate appears to be facilitated by this procedure. Unless specifically stated otherwise, the appended claims are intended to cover the addition of lime and hydrofluosilicic acid or their equivalents in any manner. The acid and lime are added in approximately theoretical proportions to form precipitates of sodium silicofluoride and calcium sulfate. The hydrofluosilicic acid appears to react with the sodium sulfate forming sulfuric acid and sodium silicofluoride, a relatively insoluble compound. On addition of lime, the latter apparently reacts with the sulfuric acid to form calcium sulfate precipitate.

The treatment of the liquor with a sulfide such as hydrogen sulfide may be effected subsequent to treatment with hydrofluosilicic acid and lime, but ordinarily it is advantageous to treat the liquor with hydrogen sulfide first, as subsequent precipitation of sodium fluosilicate and calcium sulfate tend to aid the removal of the lead and/or arsenic sulfide, particularly the latter. To facilitate precipitation of the lead and arsenic sulfides, the presence of a small amount of soluble sulfate in the liquor is desirable, and hence in the preferred embodiment of the invention the removal of substantially the last traces of sodium sulfate from the liquor is preferably carried out as the final step.

The treatment of the liquor in tank 11 with lime and hydrofluosilicic acid serves to substantially completely separate out of the liquor sulfate which may have been introduced into the system in tank 5, or which may have been contained in the acid from digest tank 1.

The liquor may be settled in tank 11, and the liquor separated from precipitated impurities. The product acid of tank 11 may be further purified, if desired, by heating to about 300° F., and then settling, this procedure assisting in the removal of any calcium sulfate which may still be contained in the acid. The final acid product of the process is a strong phosphoric acid which, where the crude phosphoric acid contains little or no organic matter, is substantially a water white acid. If organic matter should be present in the crude acid or in the product acid, organic matter may be removed or reduced by treatment with oxidizing agents and/or active carbon.

To effect partial neutralization in precipitating tank 3, alkali other than soda ash, such as caustic soda, caustic potash or potash, may be employed if desired. Other acids such as hydrofluosilicic acid may be employed as well as sulfuric acid to liberate phosphoric acid from the alkali metal phosphate in tank 5.

In the sulfide treatment of the acid liquor in precipitating tank 11, other sulfides such as calcium sulfide may be employed if desired. The use of calcium sulfide, however, is not as desirable inasmuch as the calcium tends to reduce the sulfate content of the liquor thus hindering the precipitation of lead and/or arsenic sulfide. In the preferred embodiments of the process of the invention, to bring about effective precipitation of lead and/or arsenic it is preferred to have in the liquor, at the time of treatment with sulfide in the precipitating tank 11, a sulfate content, as sulfur trioxide, of not less than about 0.5%.

When effecting final removal of sulfate in tank 11, in place of hydrofluosilicic acid, hydrofluoric acid may be employed if desired, but to less advantage since the resulting sodium fluoride is more soluble than the sodium fluosilicate produced when the liquor is treated with hydrofluosilicic acid. Also, a mixture of aluminum fluoride and hydrofluoric acid may be substituted for the hydrofluosilicic acid producing a precipitate comprising principally a double sodium aluminum fluoride. Instead of employing calcium oxide in the precipitating tank 11, alkaline earth compounds such as calcium hydroxide, calcium carbonate, monocalcium phosphate, barium oxide, hydroxide, etc., may be used.

Removal of relatively small amounts of sulfate from the liquor discharged from crystallizer 9 may be effected by treating the phosphoric acid with, say 2 to 3 volumes of alcohol, thus dissolving phosphoric acid and facilitating removal of the sodium sulfate residue by filtration, and then separating phosphoric acid and alcohol by distilling off the latter. Other solvents such as acetone and acetic acid may be used in place of alcohol.

I claim:

1. The method of making phosphoric acid which comprises partially neutralizing crude phosphoric acid liquor by the addition of alkali to a condition of weak alkalinity to methyl orange thereby forming alkali metal phosphate and precipitating insoluble phosphates and fluorine compounds, separating the mud thereby obtained from the phosphate liquor, treating the liquor with sulfuric acid in amounts sufficient to liberate phosphoric acid and to form alkali metal sulfate, crystallizing and separating alkali metal sulfate from the liquor, boiling the liquor to concentrate the same, cooling the liquor, separating a sulfate mixture therefrom, treating the liquor with hydrogen sulfide in the presence of a relatively small amount of alkali metal sulfate to precipitate impurities as insoluble sulfides, converting soluble sulfate to insoluble sulfate by treating the liquor with hydrofluosilicic acid and lime, and separating insoluble impurities from the phosphoric acid.

2. In the purification of phosphoric acid, the improvement which comprises treating phosphoric acid liquor containing alkali metal sulfate, with hydrofluosilicic acid and an alkaline earth compound to separate said alkali metal sulfate from the liquor.

3. In the purification of phosphoric acid, the improvement which comprises treating phosphoric acid liquor containing sodium sulfate first with hydrofluosilicic acid and then with lime, the said acid and lime being added in quantities sufficient to remove said sodium sulfate from the liquor.

ROBERT E. VIVIAN.